UNITED STATES PATENT OFFICE.

EDWARD GOODRICH ACHESON, JR., OF NIAGARA FALLS, NEW YORK.

METHOD OF PREPARING GRAPHITIZED VULCANIZED FIBER.

1,379,155.     Specification of Letters Patent.     Patented May 24, 1921.

No Drawing.     Application filed December 14, 1920. Serial No. 430,711.

*To all whom it may concern:*

Be it known that I, EDWARD G. ACHESON, Jr., a citizen of the United States, residing at Niagara Falls, in the county of Niagara, State of New York, have invented certain new and useful Improvements in Methods of Preparing Graphitized Vulcanized Fiber; and I do hereby declare the following to be a full, clear, and exact description of the invention, such as will enable others skilled in the art to which it appertains to make and use the same.

My invention is an improvement in vulcanized fiber-or-vulcanite and in methods of preparing the same, and the invention has for its object to provide a material of the character specified, especially adapted for bearings, or for any other purpose wherein a measure of lubrication is desired, or wherein electrical or thermal conductivity is desired, and for any other purpose for which such composition may be useful.

The improved material is composed of vulcanized fiber containing graphite distributed therethrough, and may be prepared by different methods. For instance, the material may be prepared by treating a formed web of paper, with graphite in colloidal form, as by passing it through a bath or baths containing the graphite in this form or in any other suitable manner. Afterward the web so treated is subjected to zinc chlorid or other suitable gelatinizing agent and is then shaped, washed, and seasoned, in the manner usually employed in the well known method of making vulcanized fiber.

Or if desired the material may be prepared in the following manner:

The fiber while still in the beater is mixed with finely pulverized graphite, which is in a state of suspension in the liquid of the beater. The particles of graphite thus become entangled with the fibers and to some extent may coat individual fibers. The mixture of fiber and graphite is then formed into a sheet or web, and the web is treated with a gelatinizing agent, the same as if graphite were not present. Afterward the web is washed and seasoned in the usual manner. The percentage of graphite in the finished product may vary from ¼ of 1% upwardly.

The improved material while it is especially adapted for use in bearings and the like, wherein lubrication by graphite is desired, is yet of value in other connections. As for instance where electrical or thermal conductivity is desired in the material. The graphite provides such conductivity.

While the methods above set forth are preferred methods, yet they may be modified. It will be understood also that it is not essential that the graphite be in colloidal form. The graphite may be applied in any other form that may be suitable for the purpose. While for convenience the fibers are preferably treated with the pulverized graphite in the beater, it will be understood that they are not necessarily treated in a wet state. I also contemplate treating the fibers in a dry state with pulverized graphite.

One of the features of the invention is the distributing of the graphite throughout the body of the material in such manner that every part of the material will contain the graphite. It is obvious, however, that in special cases, it might be desirable and will be feasible to distribute the graphite somewhat unevenly throughout the body. The essential feature of the process is the incorporation of the graphite with the cellulose material before the cellulose material has been converted into vulcanized fiber so that the graphite will be well distributed and will impart the desired new characteristics to the final product.

The distribution of the graphite throughout the body of the cellulose material is accomplished in the examples of my invention described above by the mode of applying the graphite in each instance. Thus when the graphite is mixed with the fiber in the beater, in the manner described, the web of paper produced from the said fiber will contain the graphite distributed evenly throughout the body of the web or finished sheet of paper. On the other hand when, as in the other example given, the graphite is applied to the fibers after they have been formed into a web or sheet of paper, the distribution of the graphite is accomplished in part by the penetration of the graphite, especially if colloidal, into the body of the web; but in this instance the distribution of the graphite is accomplished mainly by superposing a number of the said moist webs or sheets of paper upon each other thus building up a thicker sheet composed of several layers which is then thoroughly washed and cured to produce the finished product, consisting of vulcanized fiber containing graphite uniformly distributed throughout the body thereof.

I claim:

1. As an article of manufacture, a material composed essentially of vulcanized fiber containing graphite distributed therethrough.

2. As an article of manufacture, a material composed of vulcanized fiber having graphite uniformly distributed throughout the body thereof.

3. A method of preparing graphitized fiber or vulcanite, which consists in beating the fibers with finely divided graphite, forming the mixture into a web, treating the web with a gelatinizing agent, and afterward washing and seasoning the web.

4. A method of preparing graphitized fiber or vulcanite, which consists in mixing the fibers with finely pulverized graphite, afterward forming the fibers into a web, treating the web with a gelatinizing agent, and then washing and seasoning the web.

5. A process of preparing graphitized fiber or vulcanite, which consists in incorporating graphite with cellulose material prior to the process of forming said material into vulcanite.

6. A process of preparing graphitized fiber or vulcanite, which consists in incorporating a lubricant with the cellulose material prior to the treating of the fiber with the gelatinizing agent, and subsequently converting said cellulose material into vulcanite.

7. As an article of manufacture, a material composed essentially of vulcanized fiber containing a lubricant distributed therethrough.

In testimony whereof I affix my signature

EDWARD GOODRICH ACHESON, Jr.